N. DAVENPORT.
Hand-Car.
No. 215,334. Patented May 13, 1879.
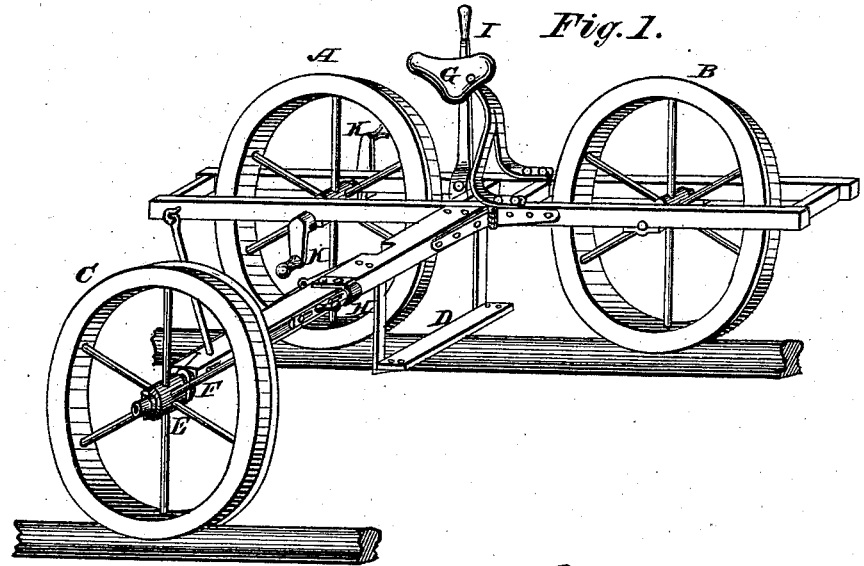
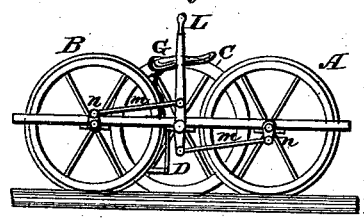
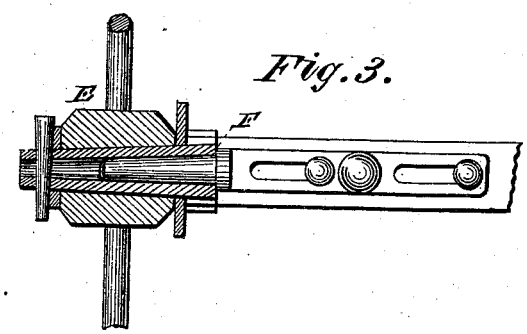
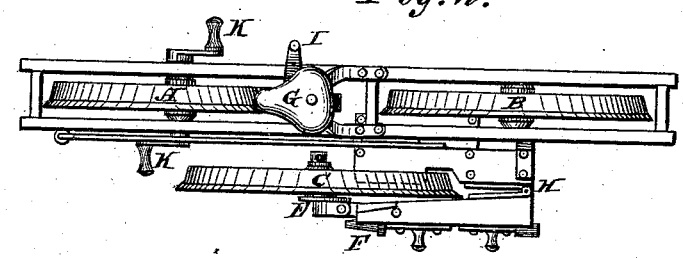

UNITED STATES PATENT OFFICE.

NELSON DAVENPORT, OF TROY, NEW YORK.

IMPROVEMENT IN HAND-CARS.

Specification forming part of Letters Patent No. 215,334, dated May 13, 1879; application filed February 6, 1879.

*To all whom it may concern:*

Be it known that I, NELSON DAVENPORT, of the city of Troy, and State of New York, have invented certain new and useful Improvements in Hand-Cars, of which the following is a clear, full, and exact description, reference being had to the accompanying drawings, and the letters of reference marked thereon, forming a part of this specification.

The nature of my invention consists in so making a hand-car that it will fold together compactly and be easily handled.

Hand-cars, as usually made, cannot be easily and conveniently handled nor transported, except upon their own wheels, on account of their weight and form of construction. Neither can they be readily put upon the track or thrown therefrom by one person.

The object of my invention is to provide a hand-car which will be very light, easily handled and propelled by one person, and yet capable of sustaining the weight of several persons, and of attaining a high rate of speed; also one which can be folded together in compact form and require but little space, and can be hung at the side of a tender or carried upon or in a car, and be ready for use at all times. In case of an accident to a train, if assistance be required, or in case it be necessary to flag a train to prevent collision with a disabled train, this car can be put upon the track by one man, and be ready for use in a few moments, and a high rate of speed be attained with but little effort.

I preferably make the car with three wheels, two of them being framed together to bear the chief weight, and the third wheel to run upon the opposite rail, and serve as a guide-wheel.

Figure 1 is a view of the car complete, ready for use, and embracing the improvements described. Fig. 2 represents the same car when folded together. Fig. 3 is a sectional view, showing a portion of the hub, axle, and auxiliary axle of wheel C. Fig. 4 shows another device for propelling the car.

The flanged wheels A and B are framed together with strong, but light, material. Extending from the center of this frame is a jointed arm, connecting the frame to the guide-wheel C. This arm is hinged to the frame, and also has a hinge or joint about the middle of its length, so that the arm will fold twice between the frame and the wheel C. These two joints, when folded, will bring the wheel C at right angles with the frame. In order to fold this wheel flat against the frame, so as to make a compact body and at the same time have a safe and secure axle for the wheel C, I make this axle, upon which the wheel C revolves, hollow, and with a joint or hinge connecting it with the arm, so that this wheel will swing against the arm and parallel with it. In order to secure it in position on the track and make a safe bearing for the wheel, an auxiliary axle, F, is made and attached to a slide running on the arm, by means of which slide the axle F is pushed closely into the hollow axle, thus forming a rigid and strong axle, and keeping the wheel C in place. By drawing back the slide, this wheel will readily swing around against the arm and parallel with it, as seen in Fig. 2.

In place of joints or hinges in this connecting-arm, it may have a hook or tenon for securing it to the frame, and be folded against the frame as a separate piece, or the wheel C may be removed from the axle and packed against the frame; but separate pieces are liable to be lost in transportation, so I prefer to hinge the pieces together.

Upon the frame one seat or two seats may be placed, and between the wheels A and B, for propelling the car; and, if required, there may be one at each end of the frame, and there may be one or more on the arm, with a foot-rest, D.

The car may be propelled by the cranks K K on one or both of the wheels A and B, worked by the feet; or it may be propelled by a lever and cranks, as shown in Fig. 4; also in other ways. I consider the cranks, as shown in Fig. 1, to be the better way, as they leave the hands of the operator free to use a signal flag or lamp.

The weight of the riders is nearly all borne by the wheels A and B, and, the bearings being here short and compact, great weight can be sustained on these wheels and frame without materially affecting the speed or ease of running of the car.

A light stay-rod is attached to one end of the frame, and hooked into the end of the arm near the wheel C, to tighten the joints and hold the arm firmly in place when the car is in use. There is also a pin, H, at the middle joint or hinge of the arm, to stiffen and keep the two parts rigidly in place.

A brake, I, is conveniently located near the operator for checking the speed of the car.

When the car is folded up it can be quickly made ready for use, as follows: Set the wheels A and B upon one rail. Straighten the arm, and turn out the wheel C upon the opposite rail. Slip the axle F into the hollow axle. Push the pin H into place, and hook the stay-rod, and the car is ready for use, making a strong, light, and serviceable hand-car, easily handled, and conveniently carried upon the tender of the engine or in or upon one of the cars, and can be quickly set upon the track for use in cases of emergency, and can be run by one person at a high rate of speed and with safety, the weight of the wheel C and the arm being more than sufficient to prevent the wheel C from tilting or jumping the rail.

I make no claim, broadly, to a hand-car with three wheels, nor to any particular device for propelling it; but What I do claim as my invention, and desire to secure by Letters Patent, is—

1. A hand-car with flanged wheels, having its opposite wheel or wheels connected by a jointed arm, by which the arm and the wheels may be folded together compactly and parallel with each other, so as to make a folding hand-car, substantially as herein described.

2. In combination with the guide-wheel of a hand-car, a jointed axle, by which the wheel can be turned parallel with its arm and parallel with the remaining wheels of the car when folded together, substantially as and for the purposes herein described.

3. In combination with the arm connecting the wheels of each side of a hand-car, a hollow jointed axle and its auxiliary axle, for additional support to the jointed axle and for holding it in place, substantially as and for the purposes herein described.

In witness whereof I have hereto set my hand this 9th day of January, 1879.

N. DAVENPORT.

Witnesses:
G. RIORDAN,
ALONZO ALDEN.